S. G. STEVENS.
BEEHIVE.
APPLICATION FILED AUG. 14, 1913.

1,097,597.

Patented May 19, 1914.

WITNESSES

INVENTOR
S. G. Stevens
BY
ATTORNEY

COLUMBIA PLANOGRAPH CO., WASHINGTON, D. C.

UNITED STATES PATENT OFFICE.

SYLVESTER GEORGE STEVENS, OF DULUTH, MINNESOTA, ASSIGNOR OF ONE-HALF TO FREDERICK C. BOWMAN, OF DULUTH, MINNESOTA.

BEEHIVE.

1,097,597.        Specification of Letters Patent.      Patented May 19, 1914.

Application filed August 14, 1913. Serial No. 784,835.

*To all whom it may concern:*

Be it known that I, SYLVESTER GEORGE STEVENS, a citizen of the United States, residing at Duluth, in the county of St. Louis and State of Minnesota, have invented certain new and useful Improvements in Beehives, of which the following is a specification, reference being had therein to the accompanying drawing.

My invention relates to improvements in beehives.

The object of my invention is to provide a beehive in which the bees may be housed upon their summer stands during the entire year and at all times having a natural circulation of air therethrough.

Another object of my invention is to provide a hive in which the bees are inclosed upon all but the lowermost side by a non-conducting material or space, and communicating with a second chamber made of metal or other heat absorbing material, whereby the upper chamber may derive all of the benefit from the heat of the sun upon the lower chamber and still the bees be perfectly protected from the cold.

A still further object of my invention is to provide a simple, cheap, and more effective beehive of this character having certain details of structure hereinafter more fully set forth.

Figure 1:
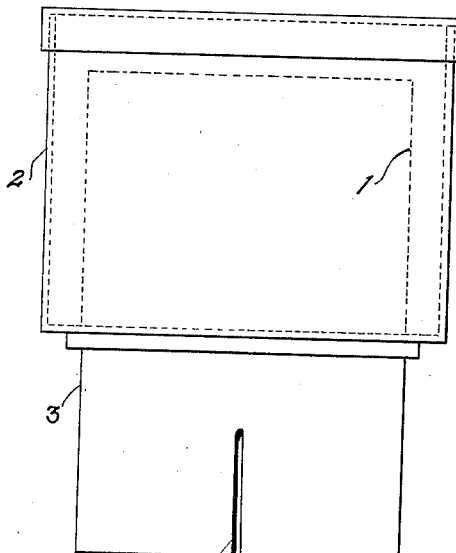
Figure 2:
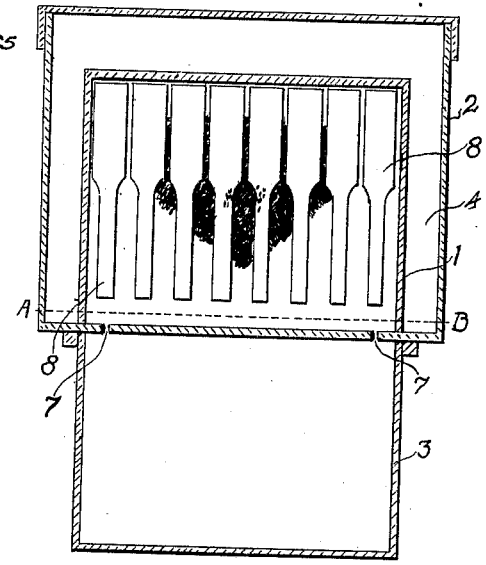
Figure 3:
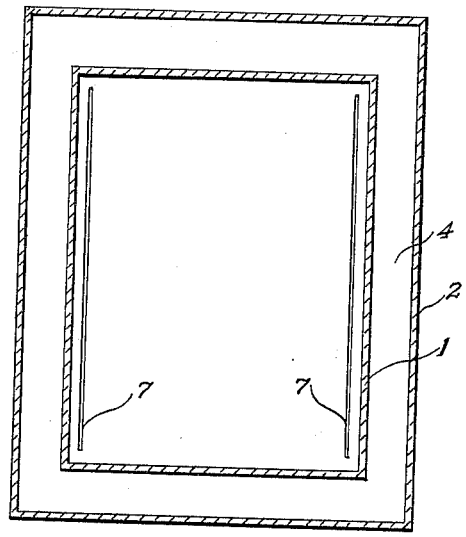

In the accompanying drawings:—Figure 1 is a front elevation of my improved hive. Fig. 2 is a vertical cross-sectional view of the same. Fig. 3 is a horizontal cross-sectional view through the line A—B of Fig. 2, looking downward.

Referring now to the drawings, 1 represents the ordinary box containing the brood frames 8, upon which the bees live. In this arrangement it is designed to incase the box 1 containing the bees within the box 2, which is considerably larger than the box 1, forming an intermediate space 4, upon five sides thereof, as shown in Fig. 2 of the drawings. The entire intermediate space 4 is preferably filled with some good granular non-conducting material, such as straw, shavings or the like, to thoroughly protect the incased hive from extreme changes in temperature. It is understood, however, that certain arrangement of air spaces intermediate the two boxes might be made to answer the same purpose.

3 represents an empty hive box, similar to the box 1 containing the colony of bees, having an open upper side and upon which the box 2, containing the box of bees, is designed to rest. The entrance to the box 3 for the bees, from the outside, is preferably provided in the form of a narrow vertical slot 6, and by bee-ways 7, communicating with the box 3 and box 1, are preferably formed as shown in Fig. 3, they continuing the entire length upon either side of the bottom of the box 2 within the box 1, whereby air is admitted to both sides of the colony clustered upon the frames 8. The entrance 6 is made vertical, as shown, with the object of producing a natural circulation of air, as the cold air will enter at the bottom and a portion of the warm air within the box 3 will naturally pass out through the upper end of the slot. The box 3 is preferably composed of thin material, to admit of as much heat as possible being created within it from the action of the sun's rays. Thus, during the cold weather, when the sun is shining, heat will be generated within the box 3 and will ascend through the bee-ways 7 to the interior of the box 1 and afford warmth for the bees, irrespective of their being surrounded with the non-conducting material as above described.

During the winter time I prefer to have the box 3 colored black to absorb as much of the sun's rays as possible, and when the summer months come on the color may be changed to prevent undue heating, provided the complete hive is kept intact for summer use, and for which latter purpose it may have many advantages in some climates, as is well known an even temperature for bees is preferable to a changeable one. However, it is evident that, if preferred, the box 1 may be entirely removed from the outer casing during the summer and placed upon the usual bottom board, or the entire upper packed story, including the bees' brood chamber, may be removed from the box 3 and placed upon the usual bottom board, and thus become what is termed a packed hive.

From the foregoing it will be seen that I have provided means for housing bees, wherein the greatest amount of heat possible is derived from the atmosphere and admitted to the colony of bees while they are surrounded and perfectly protected from the intermittent cold, which usually occurs when the sun is not shining, thus affording an opportunity for a cleansing flight immediately a warm spell occurs during the winter, and at the same time forming a hive of the least varying temperature when used as a summer hive, all of which will be readily understood by those practised in the art of bee keeping.

Having thus described my invention, what I claim and desire to secure by Letters Patent is:

1. A bee hive comprising an upper brood chamber surrounded by non-conducting material, a second chamber below the brood chamber and having openings therein and communicating with the outside atmosphere and beeways intermediate the brood chamber and the second chamber.

2. A bee hive comprising a brood chamber surrounded by non-conducting material, a second chamber made of metal below the brood chamber and having openings therein communicating with the outside atmosphere, and beeways intermediate the second chamber and the brood chamber.

3. A bee hive comprising a brood chamber, surrounded by non-conducting material, a single wall chamber below the brood chamber and having beeways communicating with the same, said second chamber having openings therein communicating with the outside atmosphere.

4. A bee hive comprising a brood chamber surrounded by non-conducting material on five sides, a second chamber below the brood chamber and having bee-ways forming communications between the same and said second chamber having vertical openings therein communicating with the outside atmosphere.

5. A bee hive comprising a brood chamber inclosed on five sides with non-conducting material, a second single wall chamber below the brood chamber and supporting the same and having bee-ways forming communication between the same, said second chamber formed of heat absorbing material and having a vertical opening therein communicating with the outside atmosphere.

6. A bee hive comprising an upper brood chamber surrounding by non-conducting material, a radiating chamber below the brood chamber having openings therein communicating with the outside atmosphere and bee-ways intermediate the brood chamber and the second chamber.

7. A beehive comprising a chamber in which the bees are housed, a second chamber inclosing the first-mentioned chamber and forming a non-conducting compartment intermediate their walls, a third chamber below that containing the bees and having opening therein communicating with the outside atmosphere, and bee-ways intermediate the third chamber and the bee-chamber.

8. A beehive comprising two vertically disposed habitable compartments communicating with each other, the uppermost compartment being surrounded by a non-conducting material or space, the lowermost compartment being formed of conductive material and having a bee-way communicating with the outside atmosphere.

9. A beehive comprising two vertically disposed habitable compartments, communicating with each other, the uppermost compartment being surrounded by a non-conducting material or space, the lowermost compartment being formed of conductive material and having a vertically disposed bee entrance in one wall of the lowermost compartment.

10. A beehive comprising an inclosed chamber in which there is sufficient vacant space below the brood frames to admit of a narrow vertical entrance several times greater in height than its width within the wall of the vacant space, whereby natural air circulation will occur below a level with the bottom of the brood frames.

11. A beehive comprising two vertically disposed habitable compartments communicating with each other by means of a plurality of bee-ways, the uppermost compartment being surrounded by a non-conducting material, the lowermost compartment being formed of conductive material, and a vertically disposed bee entrance, several times greater in height than its width in the wall of the lowermost compartment.

12. A beehive comprising a brood chamber protected from the outside atmosphere by a non-conducting substance and a radiating chamber communicating with the brood-chamber for the purpose described.

13. A beehive comprising a bee-chamber, surrounded on five sides by non-conducting material, a second chamber below the bee-chamber made of metal of a single wall-construction, bee-ways forming communications between the bee-chamber and the single wall chamber, said single wall-chamber having a vertical slot starting at its lower end and extending upwardly and communicating with the outside atmosphere for forming an entrance and exit opening for the bees.

14. A bee hive comprising a brood chamber in which the bees are housed, having elongated openings upon two opposite sides of the bottom thereof for the purpose of insuring natural circulation of air within said chamber.

15. A beehive comprising a brood chamber well protected and insulated from the elements resting upon a second chamber very sparingly protected from the elements for the purpose of freely co-circulating the air within the two chambers by natural draft.

16. A bee hive comprising a brood chamber protected from the outside atmosphere by a non-conducting substance and mounted upon a radiating chamber communicating with the brood chamber for the purpose described.

17. A bee-hive comprising a brood chamber comprising large frames for breeding and winter storage, the said chamber surrounded by a non-conducting material, a second chamber below the brood chamber, and having bee-ways forming communication between the two said chambers, one of the chambers communicating with the atmosphere.

18. A bee-hive comprising a brood chamber, comprising large frames for breeding and winter storage, the said chamber surrounded by a non-conducting material, a second chamber in communication with the first-mentioned chamber, and also with the atmosphere, the second chamber constructed of relatively thin material, the parts arranged as and for the purpose described.

19. A bee-hive comprising two chambers, the upper chamber surrounded by a non-conducting material, the lower chamber constructed of relatively thin material, the lower chamber having communication with the upper chamber, and also with the atmosphere, the parts arranged as and for the purpose described.

20. A bee-hive comprising two chambers, one placed above the other, the upper chamber serving as a brood chamber, comprising a large frame for breeding and winter storage, the said upper chamber surrounded by a non-conducting material, the lower chamber constructed of heat absorbing material and having communication with the upper chamber and also with the atmosphere, the parts arranged as and for the purpose described.

In testimony whereof I hereunto affix my signature in the presence of two witnesses.

SYLVESTER GEORGE STEVENS.

Witnesses:
  NORMAN E. LAMOND,
  A. C. DUNN.

---

Copies of this patent may be obtained for five cents each, by addressing the "Commissioner of Patents, Washington, D. C."